United States Patent

Nishio et al.

[11] Patent Number: 5,815,886
[45] Date of Patent: Oct. 6, 1998

[54] HINGE DEVICE FOR COVERS

[75] Inventors: Atsushi Nishio, Mito; Yoshikazu Abe, Ibaraki-Ken, both of Japan

[73] Assignee: Mitsumi Electric Co., Ltd., Tokyo, Japan

[21] Appl. No.: 780,209

[22] Filed: Jan. 8, 1997

[30] Foreign Application Priority Data

Jan. 31, 1996 [JP] Japan .................................. 8-038801

[51] Int. Cl.$^6$ ...................................................... E05D 11/06
[52] U.S. Cl. ................................ 16/360; 16/361; 16/268; 16/261
[58] Field of Search .............................. 16/360, 361, 385, 16/386, 260, 261, 262, 265, 268, DIG. 13, 229; 220/343, 334

[56] References Cited

U.S. PATENT DOCUMENTS

| 3,952,369 | 4/1976 | Erickson | 16/DIG. 13 |
|---|---|---|---|
| 4,584,589 | 4/1986 | Bivins et al. | 16/360 |
| 4,882,807 | 11/1989 | Frye et al. | 16/360 |
| 5,551,125 | 9/1996 | Adams | 16/261 |

FOREIGN PATENT DOCUMENTS 235721  9/1964  Austria ..................................... 16/389

Primary Examiner—Chuck Mah
Attorney, Agent, or Firm—Morrison Law Firm

[57] ABSTRACT

A hinge device is provided for pivoting a cover to a base housing and is designed such that when the cover is in a closed position it does not easily come off the base housing when subjected to external force yet the cover is easily and readily removable for replacement. The hinge device has an engagement hole 12c disposed on a housing 12 to pivotably support a cover 13 around a pivot axis, an engagement portion 13a is disposed on cover 13 to rotatably fit in the engagement hole and is formed relatively short so that it can easily disengage from engagement hole 12c when an impact is received. An arcuate guide groove 12d is formed on the housing around the engagement hole so that a guide pin 13b on the cover can engage with the guide groove to guide cover movement between open and closed positions as well as aid in absorbing impact forces acting on the cover when the cover is closed.

5 Claims, 2 Drawing Sheets

HINGE DEVICE FOR COVERS

BACKGROUND OF THE INVENTION

The present invention relates to a hinge device for supporting a cover on a base housing so that the cover can move relative to the housing, e.g., as by pivoting between open and closed position and vice versa on the housing.

Referring to FIG. 3(A), there is shown a battery charger as an example of an article having a conventional hinge device.

Referring to FIG. 3(A), battery charger 1 comprises: a main housing 3 having a cavity 3a in its upper surface for holding a battery 2 to be charged; a cover 4 rotatably supported on one end of the main housing 3 so that it can be closed to cover the entire upper surface of main housing 3; an engagement hook or catch piece 5a disposed on an upper surface on an opposite end of main housing 3; and a recess 5b disposed on opposite end of cover 4 at an inside face of the cover.

Circuitry for charging battery 2 is contained in main housing 3, and a power supply switch 3b is disposed on the upper surface of main housing 3.

Referring to FIG. 3(B), cover 4 is movably supported so that it can move from the open position shown in the drawing to a closed position covering the upper surface of main housing 3. Cover 4 is closed by pivoting movement of engagement bosses 4a (which extend in opposite directions from the two sides of cover 4), in holes 3c disposed on the sides of main housing 3.

Referring to FIG. 3(A), engagement hook 5a of engagement device 5 extends upward from the upper surface of main housing 3 and has an outwardly directed projection 5c. Further, engagement hook 5a can be elastically deformed.

Referring to FIG. 3(A), engagement recess 5b is disposed at an inner wall surface of cover 4 so that engagement claw 5a can fit into it when cover 4 is in closed position.

In battery charger 1 configured as described above, bosses 4a, disposed on one end of cover 4, rotate inside engagement holes 3c of main housing 3. When cover 4 is moved from open position to closed position, engagement recess 5b is engaged with engagement hook 5a due to the elasticity of engagement hook 5a. Thus, engagement device 5 causes cover 4 when in closed position, to be locked on the housing and cover the entire upper surface of main housing 3.

When cover 4 is in closed position, the improper application of an external force on cover 4 can cause bosses 4a to disengage from engagement holes 3c of main housing 3. In order to overcome this, bosses 4a may be formed relatively long, but then an improper application of an external force on cover 4 in open position, can cause bosses 4a to break, requiring the cover be replaced. Further, when bosses 4a are long, cover 4 is difficult to remove, making replacement difficult.

OBJECT AND SUMMARY OF THE PRESENT INVENTION

The object of the invention is to overcome the problems of the prior art described above.

A further object of the invention is to provide a hinge device that does not become disengaged when an external pressure is applied to the cover in the closed position, and that allows easy removal of the cover when the cover is in an open position.

According to the invention, the above objects are achieved by a hinge device for covers comprising: an engagement hole disposed concentrically with a pivot axis of a first member, such as a housing; and an engagement portion disposed on a second member, such as a cover, so that said engagement portion can be rotatably fitted into said engagement hole, thus allowing said second member to be pivotable around said pivot axis relative to said first member; said engagement portion is formed relatively short so that said engagement portion can disengage from said engagement hole when an impact is received. The present invention further comprises: an arcuate guide groove centering around said engagement hole and formed on said first member at least around said closed position of said second member; and a guide pin formed on said second member at a prescribed distance from said engagement portion so that said guide pin can engage with said second member.

According to the structure described above, the engagement portion disposed on the second member, such as a cover, is formed relatively short. Thus, this engagement portion engages in a relatively shallow manner relative to the engagement hole disposed on the first member, such as a cover. Thus, when the second member, such as a cover, is in the open state, and an improper external force is applied, the engagement portion can easily disengage from the engagement hole. This prevents the engagement portion disposed on the second member from breaking, and also avoids the need for the second member itself to be replaced.

Also, the engagement portion disposed on the second member fits into the engagement hole disposed on the first member. This allows the second member to be pivotably supported relative to the first member. When the second member is close to the closed position relative to the first member, the guide pin disposed on the second member engages with the guide groove disposed on the first member. This allows the second member to be supported by both the first member via the engagement portion and the guide pin.

Thus, if an improper external force is applied to the second member in the closed position, the external force is distributed between the engagement portion and the guide pin so that the engagement portion of the second member and the guide pin are prevented from easily disengaging from the engagement hole of the first member and the guide groove, respectively.

Further, if the second member is open, the guide pin of the second member is released from the guide groove of the first member. This makes it possible to easily remove the second member from the first member simply by disengaging the engagement portion of the second member from the engagement hole of the first member. Also, the second member can be easily attached to the first member simply by engaging the engagement portion of the second member with the engagement hole of the first member.

The above, and other objects, features and advantages of the invention will become apparent from the following description read in conjunction with the accompanying drawings, in which like reference numerals designate the same elements.

DETAILED DESCRIPTION OF THE PREFERRED EMBODIMENTS

Figure 1:
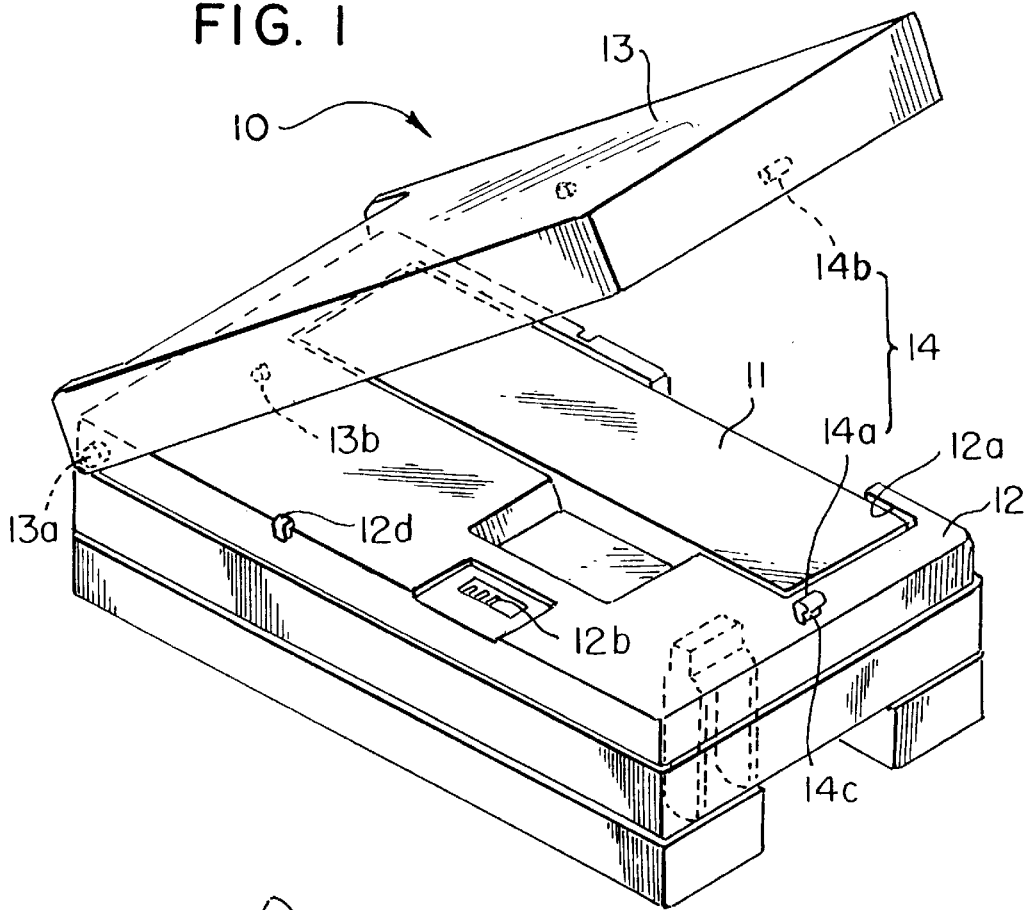
FIG. 1 is a schematic perspective drawing showing a battery charger containing an embodiment of the hinge device of the present invention.
Figure 2A:
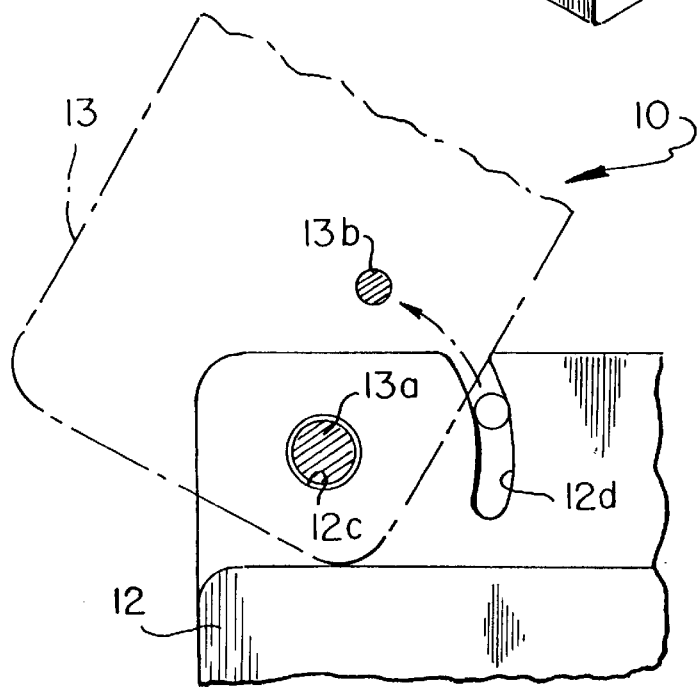
FIG. 2(A) is an enlarged side-view depicting how the engagement member carried on the cover is received in a bore in the housing to which the cover is attached, there also being shown the arrangement of a guide pin and a guide groove carried, respectively, on the cover and housing.
Figure 2B:
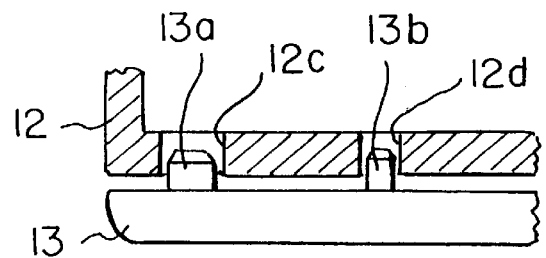
FIG. 2(B) is an enlarged fragmentary horizontal section view of the FIG. 2(A) arrangement.

Referring to FIGS. 1 and 2(A), 2(B), there is shown the structure of a battery case containing an embodiment of the hinge device of the present invention.

As seen from FIGS. 1 and 2(A), 2(B), a battery charger 10 comprises: a main housing 12 having a cavity 12a on its upper surface into which is placed a battery 11 to be charged; a cover 13 is pivotably supported on one end of main housing 12 so that cover 13 when closed covers the entire upper surface of main housing 12; and an engagement device 14 for engaging an opposite end of cover 13 with an opposite end of main housing 12 when the cover is closed.

Main housing 12 contains the circuitry for charging battery 11, and a power supply switch 12b is disposed on the upper surface of main housing 12.

Cover 13 carries aligned pivot axis defining engagement bosses 13a, which extend in opposite directions from the inner surfaces of side walls of cover 13 and fit into engagement holes of bores 12c disposed on sides of main housing 12 at an end thereof. Cover 13 is pivotably supported by bosses 13a so that it can move from the open position shown in the drawings to a closed position wherein it covers the upper surface of main housing 12.

Engagement device 14 includes a cover latching mechanism which comprises an engagement hook 14a, disposed on the upper surface of the other end of main housing 12, and an engagement recess 14b, carried at the inside of an end wall of cover 13.

Engagement hook 14a extends upward from the upper surface of main housing 12 and comprises a projection 14c projecting outwardly. Further, engagement hook 14a is formed integrally with main housing 12 which in turn is made of elastic material so as to allow elastic deformation of the hook. It also is advantageous to make the cover 13 and bosses 13a of elastic material, the bosses preferably being integral with the cover.

Figure 3A:
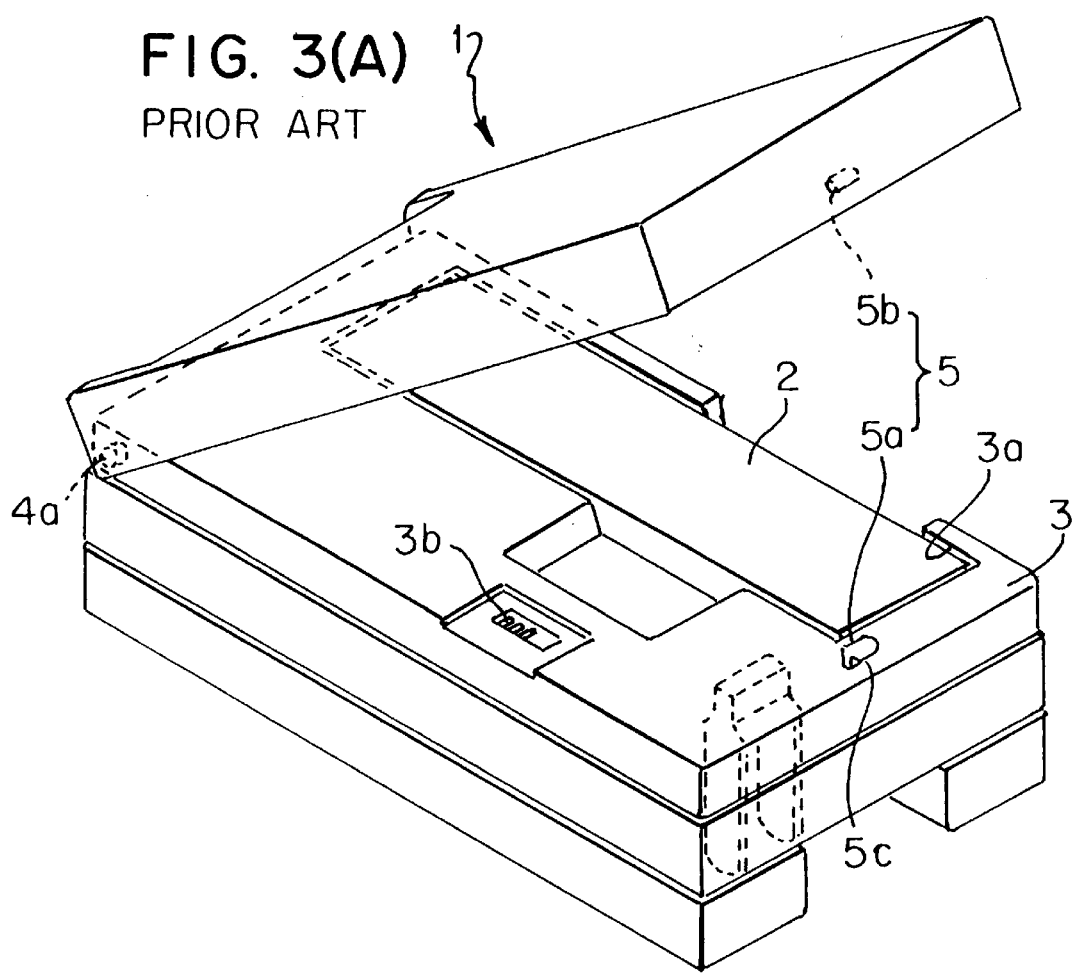
FIG. 3(A) is a schematic perspective view of a battery charger containing an example of a prior art hinge device.
Figure 3B:
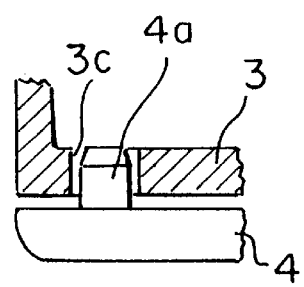
FIG. 3(B) is an enlarged fragmentary horizontal cross-section of the FIG. 3(A) hinge device.

The thus far described structure is similar to that of conventional battery charger 10 shown in FIGS. 3(A), 3(B). In battery charger 10 of the invention, bosses 13a of cover 13 are formed shorter than bosses 4a of the prior art, i.e., they have a length quite less than a length of the bores. Also, besides bosses 13a and engagement holes 12c, the hinge device for pivotably supporting cover 13 further comprises guide pins 13b facing inward as in bosses 13a of cover 13 and disposed at a prescribed distance from bosses 13a; and guide grooves 12d, disposed at the sides of main housing 12 and formed arcuate at a prescribed radius around engagement holes 12c.

Thus, bosses 13a of cover 13 engage only in a relatively shallow manner into engagement holes 12c of main housing 12. In the region around the closed position of cover 13, guide pins 13b of cover 13 fit into and are guided by guide grooves 12d of main housing 12. The guide pins locate in the guide groove during an initial movement of the cover from closed position to open position and during a terminal movement of the cover when it moves from an open to a closed position.

In battery charger 10, according to the embodiment of the invention described above, bosses 13a disposed on one end of cover 13 rotate inside engagement holes 12c of main housing 12. When cover 13 pivots from the open position shown in FIG. 1 to closed position, engagement portion 14b, formed on the inner surface at the other end of cover 13, engages with engagement hook 14a. The elasticity of engagement hook 14a causes it to fit inside engagement cavity 14b. Thus, engagement device 14 causes cover 13 to lock or be latched at the closed position, where it covers the entire upper surface of main housing 12.

When cover 13 is moving from open to closed position and during a terminal length of that travel, guide pins 13b on cover 13 fit into and are guided by guide grooves 12d of main housing 12, as shown by the dotted line in FIG. 2(A). Thus, when cover 13 is at the closed position, bosses 13a and guide pins 13b are engaged with and supported by engagement holes 12c and guide grooves 12d of main housing 12.

Thus, if an improper external force is applied to cover 13, e.g. if battery charger 10 is dropped, this external pressure is distributed between bosses 13a and guide pins 13b. Thus, bosses 13a and guide pins 13b are prevented from easily disengaging from engagement holes 12c and guide grooves 12d of the main housing.

Also, when cover 13 is opened, cover 13 is supported by main housing 12 since bosses 13a are engaged in a relatively shallow manner with engagement holes 12c of main housing 12 and, if an improper external impact force is applied to cover 13 in the open position, bosses 13a are easily disengaged from engagement holes 12c of main housing 12 and the impact effect from the external force will not damage bosses 13a.

Further, the removal of cover 13 can be performed easily simply by deliberately disengaging bosses 13a from engagement holes 12c of main housing 12. This allows easy removal of cover 13 from main housing 12. The attachment of cover 13 to main housing 12 can be performed simply by engaging bosses 13a to engagement holes 12c of housing 12.

When cover 13 is brought to the closed position, the pivoting causes guide pins 13b of cover 13 to automatically fit into guide grooves 12d of main housing 12.

In the embodiment described above, cover 13 comprises bosses 13a and guide pins 13b, and main housing 12 comprises engagement holes 12c and guide grooves 12d. However, bosses 13a and engagement holes 12c, as well as guide pins 13b and guide grooves 12d can be disposed on either cover 13 or main housing 12.

Also, in the embodiment above, engagement device 14 engaging main housing 12 and cover 13 of battery charger 10 was described. The present invention is not restricted to this, however. The present invention can be implemented for engagement devices for engaging main units and covers of other types of devices, as well as for the engagement of two members in general.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

As described above, in the present invention the engagement portion disposed on the second member such as a cover is formed relatively short. Thus, this engagement portion engages with the engagement hole disposed on the first member such as a housing in a relatively shallow manner. Thus, when the second member is in open position and an improper external force is applied thereto, the engagement portion can easily disengage from the engagement hole. This prevents the engagement portion from breaking, and avoids the need for replacing the second member itself.

In the present invention, the engagement portion disposed on the second member fits into the engagement hole disposed on the first member, thus resulting in the second member being pivotably supported by the first member. As the second member moves to the closed position relative to the first member, the guide pin disposed on the second member engages with the guide groove disposed on the first member, so that the second member is supported by the first member via the engagement portion and the guide pin.

Thus, even if an improper external force is applied to the second member, the external force is distributed between the engagement portion and the guide pin. The engagement portion and the guide pin of the second member are prevented from easily being disengaged from the engagement hole and the guide groove of the first member.

Further, when the second member is opened, the guide pin of the second member is released from the guide groove of the first member. Thus, the second member can be removed from the first member simply by disengaging the engagement portion of the second member from the engagement hole of the first member. The second member can be easily attached to the first member simply by engaging the engagement portion of the second member and the engagement hole of the first member.

Thus, according to the present invention, when the cover is in the closed position, an external force will not cause it to detach. When the cover is in the open position, it can be easily be detached and attached. Thus, the present invention provides a superior hinge device.

What is claimed is:

1. A hinge device for covers comprising:

an engagement hole disposed concentrically with a pivot axis of a first member, such as a housing;

and an engagement portion disposed on a second member, such as a cover, so that said engagement portion can be rotatably fitted into said engagement hole, thus allowing said second member to be pivotable around said pivot axis relative to said first member;

an arcuate guide groove centering around said engagement hole and formed on said first member; and a guide pin formed on said second member at a prescribed distance from said engagement portion so that said guide pin can engage in said guide groove during at least a part of a movement of the second member between open and closed positions thereof on the first member;

wherein:

said engagement portion is formed relatively short so that said engagement portion can disengage from said engagement hole when an impact is received.

2. A device for pivotably mounting a cover to a base housing so that the cover can be pivoted from a closed position wherein said cover covers an expanse of the base housing, to an open position distal said expanse, said device comprising a hinge unit having a pair of aligned pivot axis defining bosses carried on one of said cover and said base housing, a other of said cover and said base housing having a pair of open bores, respective ones of the bosses being received in associated respective ones of the bores, the bosses each having a length which is less than a length of the bores with which it is associated for providing that only a shallow engagement of the bosses with the bores can be effected so that if the said one of said cover and said base carrying the bosses is subjected to an impact force the bosses readily will disengage from the bores thereby to obviate damage to the bosses, said device further including a pair of guide pins carried one at each of two opposite side surfaces of one of said cover and said base housing, there being a pair of guide grooves on a other of said cover and base housing in which said guide pins locate during an initial movement of said cover from closed position to open position, and during terminal movement of said cover from open to closed position whereby if an external force is improperly applied to the cover in closed position, the external force is distributed between the guide pins and the bosses so that the bosses and the guide pins are prevented from easily disengaging, respectively, from the bores and the guide grooves.

3. A hinge unit in accordance with claim 2 in which at least the one of said cover and said base housing on which the bosses are carried and the bosses are made from a material having an elastic property.

4. A hinge unit in accordance with claim 3 in which the bosses are carried on the cover and the open bores are in the base housing.

5. A hinge unit in accordance with claim 2 in which the pivot axis is located at a common end of said cover and said base housing, said cover and said base housing carrying a latch mechanism at a second common end of each for latching said cover in closed position on said base housing.

* * * * *